United States Patent Office 3,239,330
Patented Mar. 8, 1966

3,239,330
SHAPED VANADIUM PRODUCT
Robert D. Carpenter, Grand Junction, Colo., assignor to Union Carbide Corporation, a corporation of New York
No Drawing. Filed Feb. 21, 1963, Ser. No. 260,302
9 Claims. (Cl. 75—3)

This invention relates to an improved vanadium pentoxide shaped product having a randomly oriented and interlocking crystal structure and to a process therefor.

Vanadium pentoxide is widely used in the metallurgical industry as the source of vanadium in the manufacture of vanadium-containing alloys. Such vanadium pentoxide for use in metallurgical processes has been generally prepared in the prior art by melting $V_2O_5$ and then casting the molten material in the form of a sheet which is then cooled and broken to form thin flakes. These flakes are subject to degradation by impact and abrasion during handling preparatory to use in alloy manufacture. Appreciable quantities of the flakes are reduced to particle sizes smaller than 20 mesh and such fine particles or dust are subsequently lost during handling. When the $V_2O_5$ flakes are introduced into an alloy melting furnace, the violence of the reaction which occurs between the vanadium pentoxide and the other constituents of the alloy mix is of such an extent that most of the fine particles of vanadium pentoxide are thrown from the reaction chamber and lost.

The generally irregular shapes of the $V_2O_5$ flakes and attendant fines caused additional processing difficulties. It is desirable that all the constituents of an alloy mix be of substantially the same particle size so that a uniformly dispersed mixture will be introduced to the melting furnace. A wide variation in particle sizes will cause an uneven mixture to be introduced to the furnace with the possibility that an undesirable alloy might result. Since the alloy mixtures are generally gravity-fed to the furnace, the $V_2O_5$ flakes also often cause "bridging" in the alloy mixture feed hopper and thus create uneven feeding.

It is, therefore, a principal object of the present invention to provide vanadium pentoxide in a form that is resistant to degradation by impact and abrasion.

It is another object to provide vanadium pentoxide in product forms having narrow particle size distribution.

According to the present invention, vanadium pentoxide can be obtained in the form of uniform shaped products which are resistant to impact and abrasion degradation and which can withstand compressive loads of greater than 100 lbs./piece. Such shaped products are obtained by the novel process which comprises contacting vanadium pentoxide feed particles with water to form a vanadium pentoxide-water mixture, shaping such mixture to form a shaped product, heating the shaped product to a first temperature less than about 300° C. and then heating the shaped product to a second temperature greater than about 500° C. and less than about 660° C. in the presence of an oxidizing atmosphere.

The vanadium pentoxide useful in the process of the present invention to form novel vanadium pentoxide shaped products should be in the form of particles smaller than about 10 mesh (Tyler Standard Sieve Scale). Preferably, at least 10 weight percent of the vanadium pentoxide particles should be smaller than 200 mesh.

The vanadium pentoxide particles are mixed with water such that the resulting mixture contains at least 5 weight percent water based on total mixture weight. Such water can be present in the form of water alone or in the form of aqueous solutions of acids, bases or salts in which $V_2O_5$ may be soluble, such as hydrochloric acid, sodium hydroxide, sodium carbonate and the like. Additional amounts of water may be required as lubricant and as a binder during subsequent shaping processes. The specific amounts of water necessary are governed by the particular shaping process being employed. A briquetting process, for example, requires a mixture containing about 10 weight percent water. An extrusion process requires about 16 weight percent water, and a balling process requires about 20 weight percent water. These water content values are only approximate and will vary depending on the physical character of the vanadium pentoxide-water mixture being shaped and on the operating requirements of the specific equipment being used.

The desired size of the shaped product will generally depend upon the size of the other constituents used in a vanadium alloy mixture. The size of the shaped product can be readily controlled during formation employing well known prior art processing techniques. Generally, the shaped products of the present invention have dimensions in the range of ⅛ to ½ inch.

After the vanadium pentoxide-water mixture is shaped by well known techniques, such as briquetting, extrusion, balling and the like, to form the desired uniform shaped product pellets, such as tablets, cylinders, balls and the like, the shaped product is heated to a temperature of less than about 300° C. to drive off substantially all the moisture. Preferably, the shaped product is heated to a temperature of about 200° C. Lower temperatures could be used for drying but would require excessively long drying times. If temperatures in excess of about 300° C. are employed in the drying step, the escaping water vapor will cause cracks in the shaped product which reduces its strength and resistance to degradation. Drying periods ranging from 10 to 30 minutes have been found adequate.

The dried shaped product is then heated to a temperature of greater than about 500° C. and less than about 660° C. in the presence of an oxidizing atmosphere. During this indurating step, the shaped product hardens into the desired final material. If the temperature is below about 500° C., insufficient hardening will take place. If the temperature is above about 660° C., the vanadium pentoxide will begin to melt and reduce the strength of the shaped product. The time of the induration period may be as little as 10 minutes, but if the time of induration is extended to 20 or 30 minutes, for example, the strength of the vanadium pentoxide shaped product is enhanced. It is generally preferred that about 40 percent of the entire heating time of the shaped product be consumed in the drying step and about 60 percent of the entire heating time be consumed in the indurating step. These heating steps can be conveniently carried out in commercially available devices, such as high temperature ovens, sinter machines, traveling grates or rotary kilns.

The oxidizing atmosphere present during the indurating step must be oxidizing to the dried vanadium pentoxide-water mixture reaction product. Such oxidizing atmosphere is conveniently obtained by using air, but oxidizing atmospheres containing more or less oxygen than air can also be used.

The shaped products obtained by the above-described process are characterized by high compressive strength in that particles of about 3/16 to ½ inch maximum dimension, for example, can withstand compressive loads of greater than 100 lbs. without degradation. Such products are also resistant to breaking and abrasion. When shaped products of the present invention having sizes in the range of ¼ to ½ inch are subjected to a tumble test (ASTM D-294-50), they produce less than 6 weight percent fines having particle sizes smaller than 28 mesh. They also have uniform geometry and composition and are lacking in the glassy crystalline appearance of prior art fused vanadium pentoxide flakes.

While not wishing to be so limiting in theory, it is believed that in the present invention the water reacts with vanadium pentoxide to form vanadic acids. When such vanadic acids are dried and then heated in an oxidizing atmosphere to temperatures above 500° C., they then decompose to $V_2O_5$ and water. The resulting $V_2O_5$ crystallizes in a randomly oriented and interlocking system. When the water-$V_2O_5$ mixture is compacted by a process such as pelletizing, briquetting, or extrusion before such crystallization occurs, a hard, dense, high strength product is formed by virtue of crystal interlocking. It is not necessary that all of the $V_2O_5$ be converted to a vanadic acid in order to achieve the desired result. The formation of a thin surface layer of vanadic acid on the $V_2O_5$ particles is sufficient to form a strong particle to particle bond by interlocking of micro crystals of $V_2O_5$.

The following examples further illustrate the process and products of the present invention.

*Example I*

Vanadium pentoxide powder smaller than 10 mesh and containing 30 weight percent finer than 200 mesh was blended with water to form a homogeneous mixture containing 15 weight percent water and 85 weight percent vanadium pentoxide. This mixture was fed continuously to a disk pelletizer where additional water was added which caused the $V_2O_5$-water mixture to form into spherical pellets varying from 3/16-in. to 1/2 in. diameter. The additional water added at the pelletizer amounted to about 5 weight percent of the dry $V_2O_5$ weight. The shaped pellets were then heat treated in a sinter machine, the hearth of which was divided into a drying chamber and an indurating chamber. The residence time in the drying chamber (about 200° C.) was about 17 minutes and the residence time in the indurating chamber (about 600° C.) was about 25 minutes. The average compressive strength of the cooled product pellets was 107.5 pounds/pellet. By comparison, the compressive strength of 1/4-in. prior art fused $V_2O_5$ flakes was about 9.9 pounds/piece.

*Example II*

In another test, spherical pellets were prepared by rolling a mixture consisting of 20 weight percent water and 80 weight percent vanadium pentoxide (particles smaller than 10 mesh) in a balling drum. The resulting pellets were dried 30 minutes at a temperature below 300° C. and then heated 30 minutes at 600°–640° C. After cooling, a representative sample of the 3 x 8 mesh size fraction of the treated pellets was dropped 18 feet 10 times onto a base consisting of a 1/2-in. thick steel plate resting on a concrete floor. An equal weight sample of 3 x 8 mesh prior art fused $V_2O_5$ flake was also dropped 18 feet 10 times onto a base of similar material. Each sample was then screened on an 8 mesh screen and the quality of the two products was compared on the basis of the amount of minus 8 mesh particles formed by breakage during impact.

| Test material: | Weight percent of 8-mesh particles formed by impact |
|---|---|
| 3 x 8 mesh pellets | 0.8 |
| 3 x 8 mesh fused flake | 24.5 |

It is apparent from the above results that the shaped product of the present invention is substantially more resistant to impact degradation than the prior art material.

*Example III*

Vanadium pentoxide having all particles smaller than 10 mesh was thoroughly mixed with water to form a homogeneous mixture containing 10 weight percent water and 90 weight percent $V_2O_5$. This mixture was then molded into cylindrical briquettes 1/2-in. in diameter and 1/2-in. long with a compaction pressure of about 25,000 p.s.i. The briquettes were dried for 30 minutes at 110° C. and heat treated for 30 minutes at 500° C. The compressive strength of the cooled briquettes in a direction parallel to the radius of the cylinder was 290 lbs./briquette. In a direction parallel to the axis of the cylinder, the compresive strength of the briquettes exceeded 1500 lbs./briquette.

*Example IV*

Vanadium pentoxide having all particles smaller than 10 mesh was thoroughly mixed with water to form a homogeneous mixture containing 16 weight percent water and 84 weight percent $V_2O_5$. This mixture was continuously fed to an extrusion type of pelletizer having a 3/16-in. diameter die. The extruded product was in the form of cylindrical pellets 3/16-in. diameter and approximately 5/16-in. long. The pellets were dried at 80° C. and then heat treated for 30 minutes at 600–640° C. The average crushing load of the pellets after cooling was 160 lbs./pellet in a direction parallel to the cylindrical diameter.

*Example V*

Vanadium pentoxide powder smaller than 10 mesh and containing at least 20 weight percent finer than 200 mesh was blended with water to form a homogeneous mixture containing 20 weight percent water and 80 weight percent $V_2O_5$. This mixture was fed to a balling pan wherein shaped product pellets in the form of 3/8-in. diameter balls were obtained. The shaped balls were dried at about 200° C. and then heated to 600–660° C. The resulting hard vanadium concentrate nodules contained 95.97 weight percent $V_2O_5$ and 2.65 weight percent $V_2O_4$. A vanadium alloy mixture consisting of 2000 lbs. of the above-prepared vanadium concentrate nodules, 1250 lbs. of aluminum shot (3/8-in. x D), 550 lbs. of mill scale ($Fe_3O_4$), 262 lbs. of steel punchings, 400 lbs. of an iron-vanadium-silicon alloy (containing 24.4 weight percent vanadium), 100 lbs., of ground fluorspar and 30 lbs. of coke was then blended and charged to an alloy melting furnace. The charge mixture was readily dispensed and the alloy formation reaction started off and proceeded with very good control. A total of 98.93 weight percent of the charged vanadium was accounted for leaving a desirably low 1.07 weight percent unaccounted for loss of vanadium.

What is claimed is:

1. A hard, dense vanadium pentoxide shape having a randomly oriented and interlocking crystal structure, which is resistant to degradation caused by impact and abrasion, and capable of withstanding a compressive load of greater than 100 lbs. per shape.

2. A hard, dense vanadium pentoxide pellet having a randomly oriented and interlocking crystal structure, which is resistant to degradation caused by impact and abrasion, such pellet having a size of 1/8 to 1/2 inch maximum dimension and capable of withstanding a compressive load of greater than 100 lbs. per pellet.

3. A process for producing a hard, dense vanadium pentoxide shape having a randomly oriented and interlocking crystal structure, which is resistant to degradation caused by impact and abrasion which comprises contacting vanadium pentoxide feed particles with water to form a vanadium pentoxide-water mixture thereby reacting at least a portion of the vanadium pentoxide with water to form vanadic acids, shaping such mixture to form a shaped product, heating the shaped product to a first temperature less than about 300° C. and then heating the shaped product to a second temperature greater than about 500° C. and less than about 660° C. in the presence of an oxidizing atmosphere thereby reoxidizing the vanadic acids to vanadium pentoxide.

4. A process for producing a hard, dense vanadium pentoxide shape as set forth in claim 3 wherein the vanadium pentoxide feed particles are smaller than 10 mesh.

5. A process for producing a hard, dense vanadium pentoxide shape as set forth in claim 3 wherein the vanadium pentoxide feed particles are smaller than 10 mesh and at least 10 weight percent of the particles are smaller than 200 mesh.

6. A process for producing a hard, dense vanadium pentoxide shape as set forth in claim 3 wherein the vanadium pentoxide-water mixture contains at least 5 weight percent water.

7. A process for producing a hard, dense vanadium pentoxide shape as set forth in claim 3 wherein the first temperature is about 200° C.

8. A process for producing a hard, dense vanadium pentoxide shape as set forth in claim 3 wherein the time at first temperature is about 40 percent of the total heating time and the time at second temperature is about 60 percent of the total heating time.

9. A process for producing a hard, dense vanadium pentoxide shape having a randomly oriented and interlocking crystal structure, which is resistant to degradation caused by impact and abrasion which comprises contacting vanadium pentoxide particles smaller than 10 mesh and at least 10 weight percent of the particles are smaller than 200 mesh with water to form a vanadium pentoxide-water mixture containing at least 5 weight percent water thereby reacting at least a portion of the vanadium pentoxide with the water to form vanadic acids, shaping such mixture to form a shaped product, heating the shaped product to a first temperature of about 200° C., and then heating the shaped product to a second temperature greater than about 500° C. and less than about 660° C. in the presence of an oxidizing atmosphere thereby reoxidizing the vanadic acids to vanadium pentoxide wherein the time at first temperature is about 40 percent of the total heating time and the time at second temperature is about 60 percent of the total heating time.

References Cited by the Examiner

UNITED STATES PATENTS

| | | | |
|---|---|---|---|
| 2,050,266 | 8/1936 | Boyer | 75—129 |
| 2,298,464 | 10/1942 | Burwell | 23—140 |
| 2,511,400 | 6/1950 | De Jahn | 75—3 |
| 2,791,501 | 5/1957 | Brennan | 75—129 |
| 2,925,336 | 2/1960 | Stowasser | 75—3 |

FOREIGN PATENTS

| | | |
|---|---|---|
| 570,989 | 2/1959 | Canada. |

BENJAMIN HENKIN, *Primary Examiner.*